No. 855,861. PATENTED JUNE 4, 1907.
L. L. MINCER.
EYEGLASSES.
APPLICATION FILED DEC. 1, 1905.
3 SHEETS—SHEET 1.
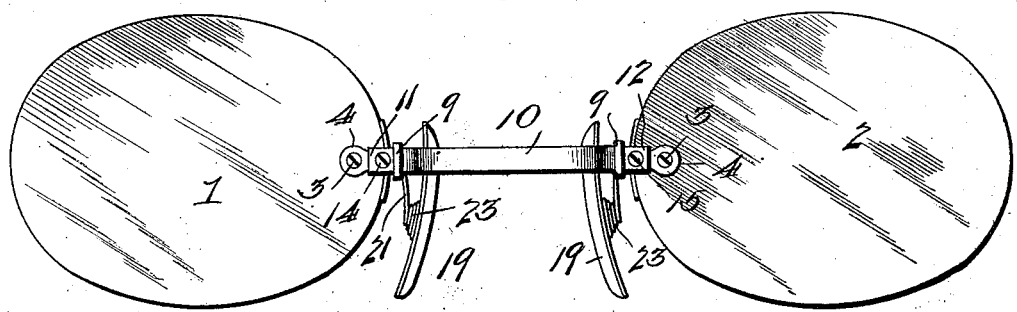
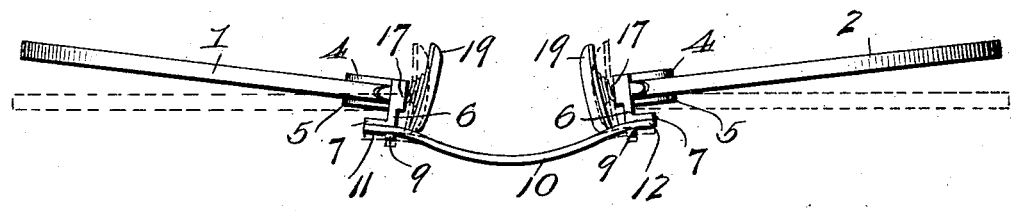
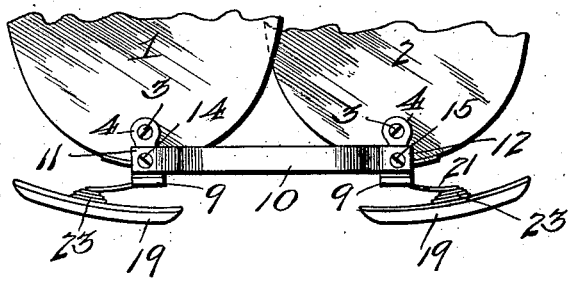
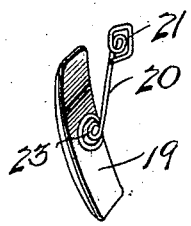
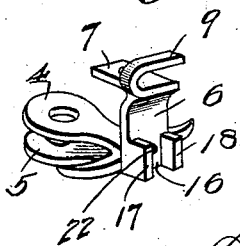
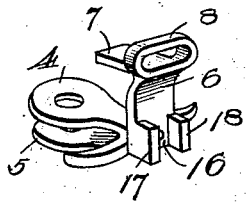
Witnesses
Inventor: Louis Labe Mincer
By Joseph F. Atkins
Attorney No. 855,861. PATENTED JUNE 4, 1907.
L. L. MINCER.
EYEGLASSES.
APPLICATION FILED DEC. 1, 1905.
3 SHEETS—SHEET 2.
Fig. VII.
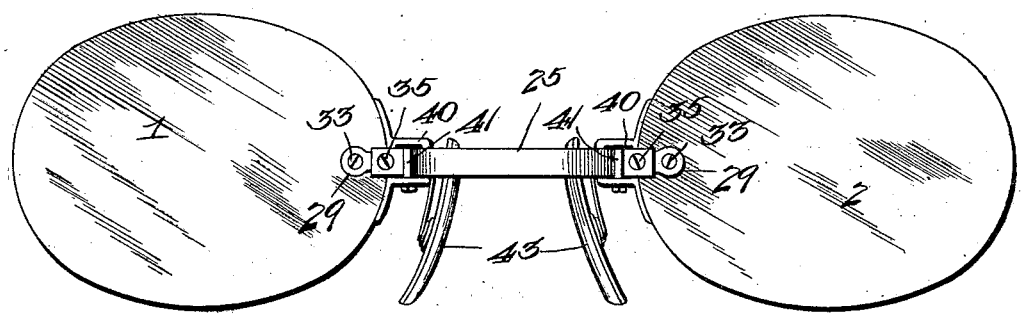
Fig. VIII.
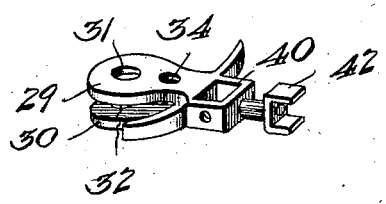
Fig. IX.
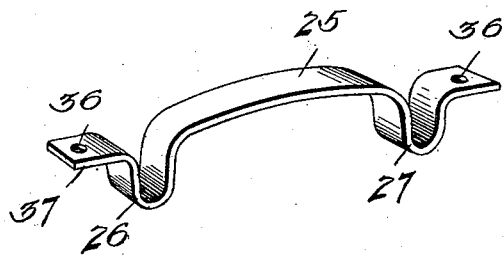
Witnesses
Inventor:
Louis Labe Mincer
By Joseph Littkins
Attorney No. 855,861. PATENTED JUNE 4, 1907.
L. L. MINCER.
EYEGLASSES.
APPLICATION FILED DEC. 1, 1905.
3 SHEETS—SHEET 3.
Fig. X.
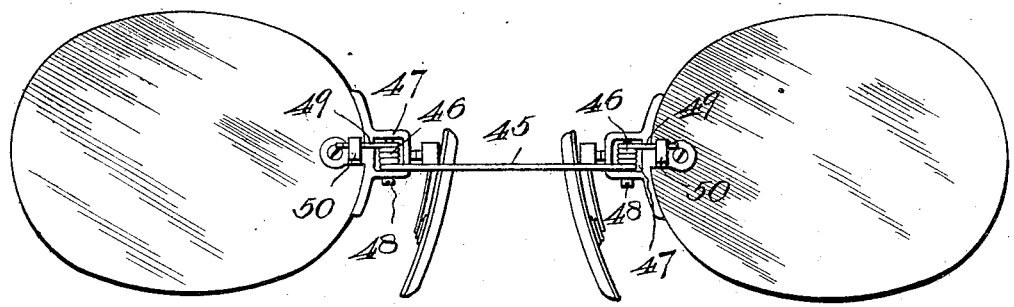
Fig. XI.
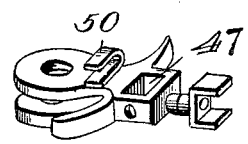
Fig. XII.
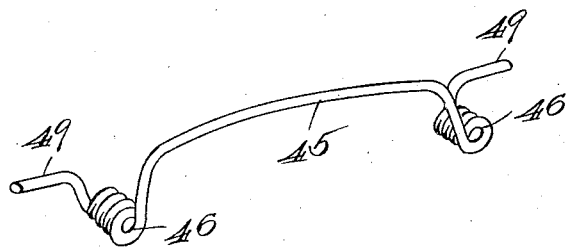
Witnesses
Inventor
Attorney

UNITED STATES PATENT OFFICE.

LOUIS LABE MINCER, OF ROCHESTER, NEW YORK.

EYEGLASSES.

No. 855,861.　　　Specification of Letters Patent.　　　Patented June 4, 1907.

Application filed December 1, 1905. Serial No. 289,806.

*To all whom it may concern:*

Be it known that I, LOUIS LABE MINCER, of Rochester, in the county of Monroe, State of New York, have invented certain new and useful Improvements in Eyeglasses, of which the following is a specification.

The object of my invention is to produce improvements in eye-glasses of the nose-glass type, whereby the resilient action of the spring which holds the glasses upon the nose is operatively developed transversely to the plane of the lenses instead of in a plane parallel to the lenses as it is in the ordinary type of nose glass as well as in that class of glasses in which one lens is drawn toward the other by a spring connection.

My invention includes certain fittings for reducing to practical embodiment the principle of my invention as herein set forth, especially means for folding the glasses into small compass for the pocket, as well as an improved form of guard mounting for nose-glasses generally.

In the accompanying drawings, which constitute a part of this specification, Figure I is a front elevation of a pair of nose-glasses, constructed in accordance with the principle of my invention, and which serves equally to illustrate, as will appear from the specification, the stiff-frame glasses or the folding-frame glasses. Fig. II is a view at right angles to Fig. I, showing the normal positions of frame and lenses in full lines, and their engaging positions upon a nose in dotted lines. Fig. III is a partial view, corresponding to Fig. I, of a folding-frame pair of glasses, showing the glasses folded or closed to reduce their compass so that they may be introduced into a pocket or case for the pocket. Fig. IV is a perspective view of a guard, showing my improved coil-spring guard-support attached thereto. Fig. V is a perspective view of a lens-and-spring connecting-member or frame-piece adapted for the construction of the folding-frame glasses shown in Fig. III. Fig. VI is a view in all respects corresponding to Fig. V, but differentiated from it only by the closed spring loop instead of the open spring loop, by which differentiation it is adapted for use in stiff-frame glasses. The difference between the open and closed spring loop is, in fact, the only difference between the stiff-frame and the folding-frame glasses. It is, for that reason, the closed loop and the open loop appearing the same in front elevation, that Fig. I is, as has been specified, equally illustrative, in front elevation, of the two forms of glasses referred to. Fig. VII is a view similar to Fig. I, showing a flat spring similar to that shown in Fig. I but of modified form and with frame-pieces modified to accommodate the same. Fig. VIII is a perspective view of one of the frame-pieces shown in Fig. VII, detached. Fig. IX is a similar view of the spring shown in Fig. VII detached. Fig. X is a view similar to Fig. VII, showing a still further modification of spring, to wit, one of round shape in cross section, and whose resiliency is derived from terminal coils operatively secured in the respective lens-frame-pieces. Fig. XI is a perspective view of one of the lens-frame-pieces detached, shown in Fig. X. Fig. XII is a perspective view of one of the springs shown in Fig. X.

Referring to the numerals on the drawings, 1 indicates one lens and 2 the other of a pair of nose-glasses, to which are secured, as by a screw 3 connecting them upon opposite sides through each lens, clips 4 and 5 of frame-pieces corresponding to but differentiated from the usual frame-pieces.

The frame-pieces referred to are clearly shown in Figs V and VI, which are identical except for the differentiation of the spring-loops therein, as hereinbefore specified in the description of those figures. Each is provided with a spring-stud 6 having a spring-plate 7 and a spring-loop, designated by the numeral 8 in Fig. VI, and by the numeral 9 in Fig. V. The loop 8 is continuous, and the loop 9 is open on one side for the performance of a function previously alluded to but hereinafter more fully explained.

10 indicates a spring whose ends 11 and 12, respectively, are secured, as by screws 14 and 15, to the respective spring-plates 7 in front of the lenses. The screws 14 and 15, respectively, serve to rigidly unite the spring 10 to the lens-frame-pieces, respectively, if they be provided with a loop 8, but if the loop 9 be provided, those screws serve as pivotal members, about which, movement of the frame-pieces, with respect to the frame 10, may be made. (Compare Figs. I and III.) Each of the frame-pieces is also provided with a guard-stud 16 preferably provided upon opposite sides, with cheek-plates 17 and 18, which confine between them the guard shank, which may be of any usual or preferred form. I prefer that the rearwardly extending guard, indicated by the numeral 19, should be provided with my spring support 20, which preferably consists of a confining-terminal-member 21, which affords purchase for the screw 22 to hold it in place between the cheek-plates 17 and 18. Its other end terminates in a true spiral spring 23, that is to say, a spring formed of a curved member whose convolutions continuously increase or decrease in diameter. Said spring is soldered or otherwise secured to the back of the guard 19 and which serves automatically to adjust the guard to the surface against which the resiliency of the spring 10 yieldingly urges it. My coil-spring guard-support is applicable to a variety of forms of nose-glasses, and particularly to each form of eye-glasses shown in this application.

It has been specified that if the open spring-loops 9 be employed, the screws 14 and 15 serve as pivots, about which the lens-frame-pieces turn. This operation is illustrated, by change of position, in Fig. III of the drawings, wherein the lenses 1 and 2 are moved toward each other about the pivots 14 and 15, the open loops 9 of the lens-frame-pieces freely permitting such movement. These open loops also serve to limit the movement of the lenses away from each other, so that when the lenses are in use their axes are substantially horizontal, as shown in Fig. 1.

It should be observed in respect to the figures already referred to as well as with reference to the other figures of the drawings that in each instance the connection between the spring 10 or corresponding member is made exclusively with the lens-frame-pieces independently of the lenses themselves so far as any direct connection is concerned.

In Figs. VII to IX inclusive a slight modification of the means of connecting the spring to the lens-frame-pieces is shown. In those figures, so far as it is shown, the spring, there designated by the numeral 25, but corresponding in function to the spring 10 previously described, is slightly modified from the spring 10. It is provided near its opposite ends with a pair of bends 26 and 27 (see Fig. IX) which serve at the same time to increase its resiliency and to contribute to the means of union with the lens-frame-pieces, to which it is secured. The lens-frame-pieces, as shown in Fig. VIII, are modified to accommodate the bends 26 and 27. Each lens-frame-pieces, as shown in that figure, is provided with lens clips 29 and 30, having co-axial apertures 31 and 32 for the reception of a lens-retaining screw 33. (See Fig. III.) The outer clip 29 is also provided with a threaded aperture 34 for the reception of a screw 35, which passing through an aperture 36 in one of the terminal plates of the spring 25 affords means of securing that spring in place. Additional means of connection with the bends 26 and 27, respectively, are provided. They consist preferably of a box or rectangular aperture 40 in the lens-frame-piece adapted to receive one of the bends 26 or 27. The screw 41, secured in the box 40 and extending transversely through the bend of the spring 25, holds that spring snugly into engagement with the lens-frame-piece and without any strain upon the lens. 42 indicates the guard-stud to which the guard 43 is secured in the usual manner not necessary to describe again particularly. The function of the spring 25 is substantially identical with that of the spring 10, in the stiff-frame type of glasses previously described. The only modification is in the manner of securing the spring to the lens-frame-pieces.

In Figs. X to XII I show a modified form of spring, with a slight modification of the lens-frame-pieces to accommodate it. The spring 45 is preferably of round shape in cross section. It is provided near its opposite ends with resilient coils 46, accommodated, respectively, in boxes 47 provided for them in the lens-frame-pieces and substantially identical with the boxes 40 previously described. Each of the boxes 47 is provided with a screw 48, which is substantially identical with the screws 41 already referred to. Each is adapted to pass through one of the coils 46 and to secure it in place. Each prolonged end 49 of the spring 45 is secured to its lens-frame-piece as by a keeper 50, corresponding in function to the screw 35, but preferably consisting of a hook, as clearly shown in Fig. XI.

With reference to the terminology of the claims, it may be stated that the loops 8 and 9 and the boxes 40 and 47 are generically designated as spring-confining members for the reason that the members enumerated perform the common function of confining the spring in place upon the lens-frame-pieces, and constitute, with the screws 14 and 15, and 35 and the keepers 50, plural means of uniting the lens-frame-pieces and their spring in the several forms illustrated and described.

Briefly described, the operation of my glasses when in use is as follows. Taking, for example, the glasses shown in Fig. I, which are representative of the several types or modified forms of glasses shown and described in this application, including the folding glasses shown in Fig. III when in position for use, the wearer, by manipulation of the lenses 1 and 2, gently bends the spring 10 against the force of the tension of the spring until the guards 19 are sufficiently separated to admit of their being placed astride the nose of the intended wearer, the springs 23, by which the guards 19 are supported, respectively serving to adjust the guards to their position upon opposite sides of the nose. The proper position of the glasses when in use is shown in dotted lines in Fig. II of the drawings, wherein the lenses 1 and 2 are shown to occupy the same plane. The normal position of the lenses in the glasses when not in use is at an angle to the plane they occupy when in use, as shown in full lines in Fig. II. The deviation between the two positions as shown in full and dotted lines is slightly exaggerated in order to make clear the principle of operation of the mechanism.

The principle of operation of the glasses is the same throughout the various modifications illustrated, the variations being shown to clearly illustrate the different forms of embodiment of the same idea.

In the folding-frame type of glasses shown in Fig. III, the loops 9 of the lens-frame-pieces serve, when the lenses are separated for use, to unite the lens-frame-pieces and the spring 10 precisely in the same manner as they are united by the loop 8 in the stiff-frame type of glasses. The distinction is that by the employment of the open loop 9 the screws 14 and 15 may be utilized as pivots, whereas in the closed loop construction they are simply retaining-members, co-operating with the loops 8 to hold the lenses rigidly in fixed positions, respectively.

What I claim is:—

1. As an improvement in eye-glasses, the combination with a pair of lens-frame-pieces adapted, respectively, to support lenses and provided with boxes, of a spring provided with bent portions adapted to enter the boxes respectively, screws passing through the boxes and the bent portions of the spring, respectively, and additional means for securing the spring to the lens-frame-pieces, respectively.

2. As an improvement in eye-glasses, the combination with a guard, of a guard-support comprising a true spiral spring and a spring support, and means for securing the guard-support to the lens-frame-piece of an eye-glass.

3. As an improvement in eye-glasses, the combination with a pair of lens-frame-pieces provided with boxes, of a spring provided with resilient coils adapted to enter said boxes respectively, securing means passing through the boxes and the resilient coils, respectively, and additional means for securing the spring to the lens-frame-pieces.

4. As an improvement in eye-glasses, the combination with a lens-frame-piece and a guard, of a guard-support provided at one end with means for securing it to the lens-frame-piece and at the other with a true spiral spring secured to the guard.

In testimony whereof I have hereunto signed my name in the presence of two subscribing witnesses.

LOUIS LABE MINCER.

Witnesses:
   IDA A. ZIMMER,
   C. P. DOWNS.